UNITED STATES PATENT OFFICE.

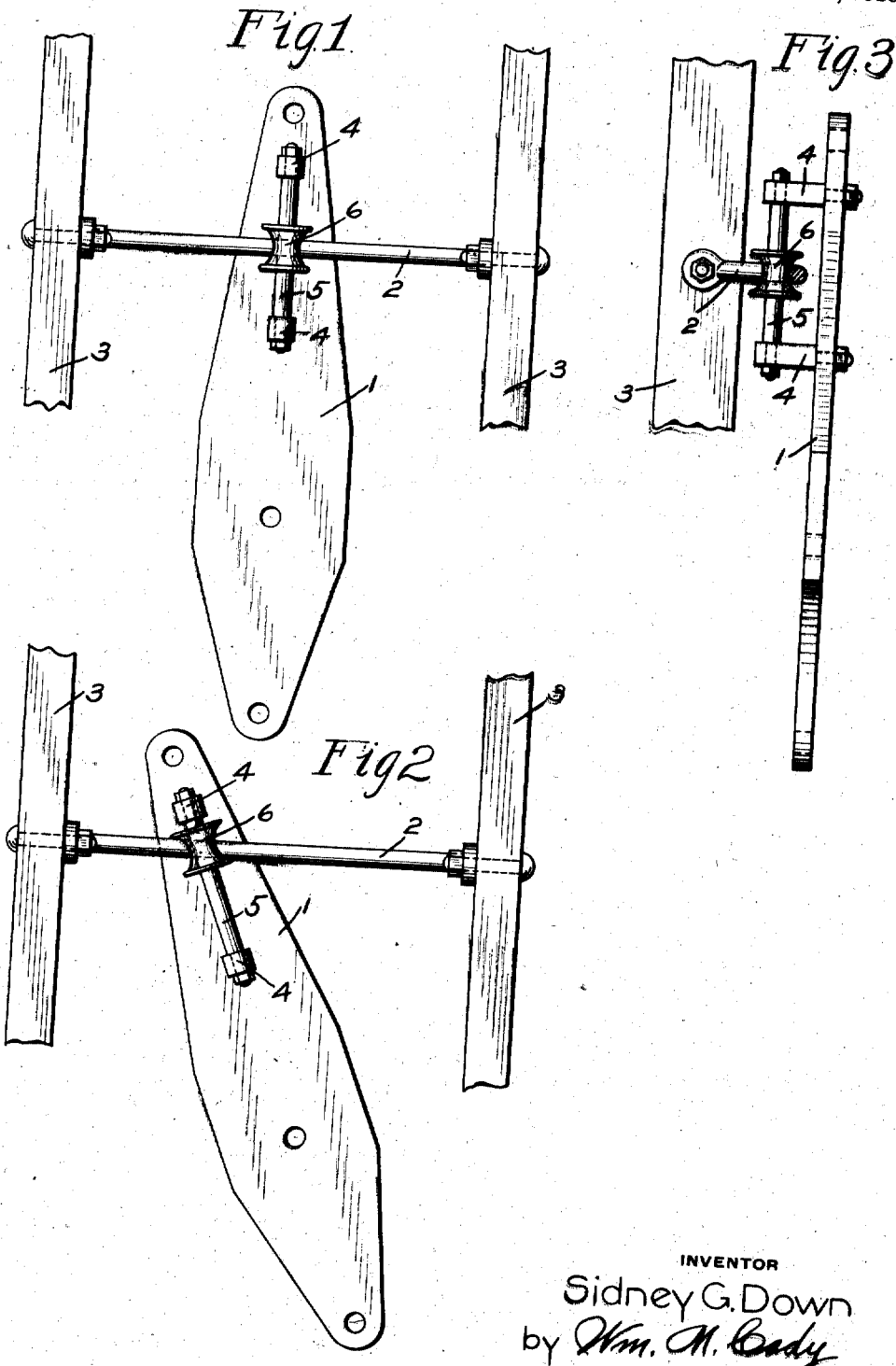

SIDNEY G. DOWN, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

BRAKE-RIGGING SUPPORT.

1,281,535.  Specification of Letters Patent.  Patented Oct. 15, 1918.

Application filed August 9, 1917. Serial No. 185,369.

*To all whom it may concern:*

Be it known that I, SIDNEY G. DOWN, a citizen of the United States, residing at Berkeley, in the county of Alameda and State of California, have invented new and useful Improvements in Brake-Rigging Supports, of which the following is a specification.

This invention relates to brake rigging, and the principal object of the invention is to provide improved means for supporting brake levers.

It has heretofore been proposed to provide a supporting means for horizontally arranged brake levers in which the lever is slidably supported. Besides offering frictional resistance to movement, the above mentioned construction is more or less noisy in operation, especially if the lever support has not been lubricated.

According to my invention, a roller support is provided for the lever, which will operate easily even if lubrication is neglected and in which the frictional resistance to movement is reduced.

In the accompanying drawing; Figure 1 is a plan view of a brake lever in application position showing the improved supporting means associated therewith; Fig. 2 a similar view, showing the brake lever in release position; and Fig. 3 a side elevation thereof.

As shown in the drawing, the reference numeral 1 indicates a horizontally arranged brake lever and for supporting same, a rod 2 is secured to adjacent cross sills 3 of the car. Secured to the end of the lever 1, which is to be supported, are standards 4 in which is mounted a rod 5 forming the bearing support for a roller 6 having a concave bearing face adapted to engage the supporting rod 2.

When the brakes are released, the parts are in the positions shown in Fig. 2 of the drawing and upon applying the brakes, the lever 1 moves to the position shown in Fig. 1 of the drawing and during this movement, the roller 6 rolls along the rod 2 and at the same time, the roller slides along the bearing rod 5 to allow for the angular movement of the brake lever, the roller being held to the rod 2 by the flanges thereon and the concave shape of its bearing surface.

In the release movement, the roller 6 rolls on the rod 2 back to the release position shown in Fig. 2 of the drawing.

Having now described my invention, what I claim as new and desire to secure by Letters Patent is:

1. The combination with a brake lever, of a supporting member carried by the car, a roller mounted on said member, and a rod secured to said lever upon which said roller is rotatably mounted.

2. The combination with a brake lever, of a supporting member carried by the car, a roller mounted on said member, and a rod secured to said lever upon which said roller is slidably and rotatably mounted.

3. The combination with a brake lever having an angular movement, of a rod, and a roller mounted on the lever and having a concave bearing face adapted to engage the rod to facilitate angular movement of the brake lever.

In testimony whereof I have hereunto set my hand.

SIDNEY G. DOWN.

Copies of this patent may be obtained for five cents each, by addressing the "Commissioner of Patents, Washington, D. C."